United States Patent [19] … Vo et al.

[11] Patent Number: 4,737,926
[45] Date of Patent: Apr. 12, 1988

[54] OPTIMALLY PARTITIONED REGENERATIVE CARRY LOOKAHEAD ADDER

[75] Inventors: Thang Vo; Patrick P. Gelsinger, both of Santa Clara, Calif.

[73] Assignee: Intel Corporation, Santa Clara, Calif.

[21] Appl. No.: 820,384

[22] Filed: Jan. 21, 1986

[51] Int. Cl.⁴ ............................................. G06F 7/50
[52] U.S. Cl. ..................................................... 364/787
[58] Field of Search ......................................... 364/787

[56] References Cited

U.S. PATENT DOCUMENTS 3,697,735 10/1972 Hanson ................................ 364/787
3,700,857 10/1972 Saenger et al. ...................... 364/787
4,584,661 4/1986 Grundland .......................... 364/787
4,623,981 11/1986 Wolrich et al. .................. 364/787 X

FOREIGN PATENT DOCUMENTS 164450 12/1985 European Pat. Off. .
876989 1/1958 United Kingdom .

Primary Examiner—David H. Malzahn
Attorney, Agent, or Firm—Blakely, Sokoloff, Taylor & Zafman

[57] ABSTRACT

An improved scheme for generating a carry lookahead is described. An irregular grouping, wherein large bit groups are used in the middle and shorter bit groups are used at the ends, provides for a reduction in carry propagation delay.

8 Claims, 2 Drawing Sheets

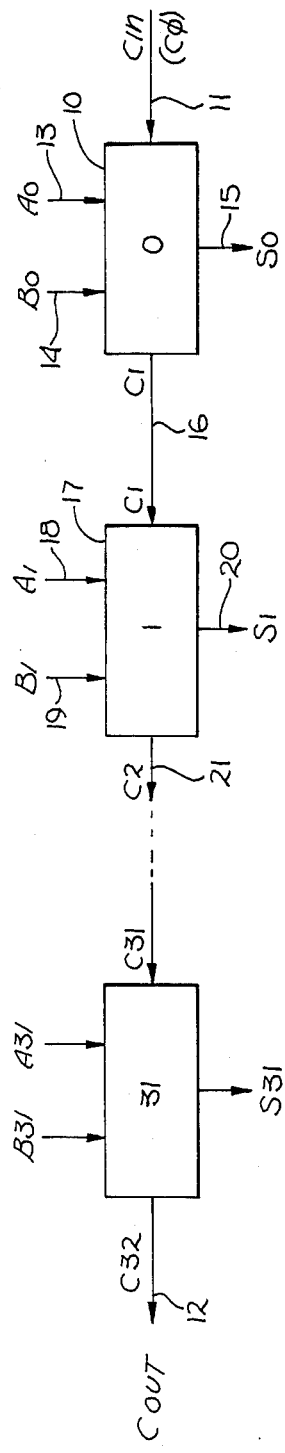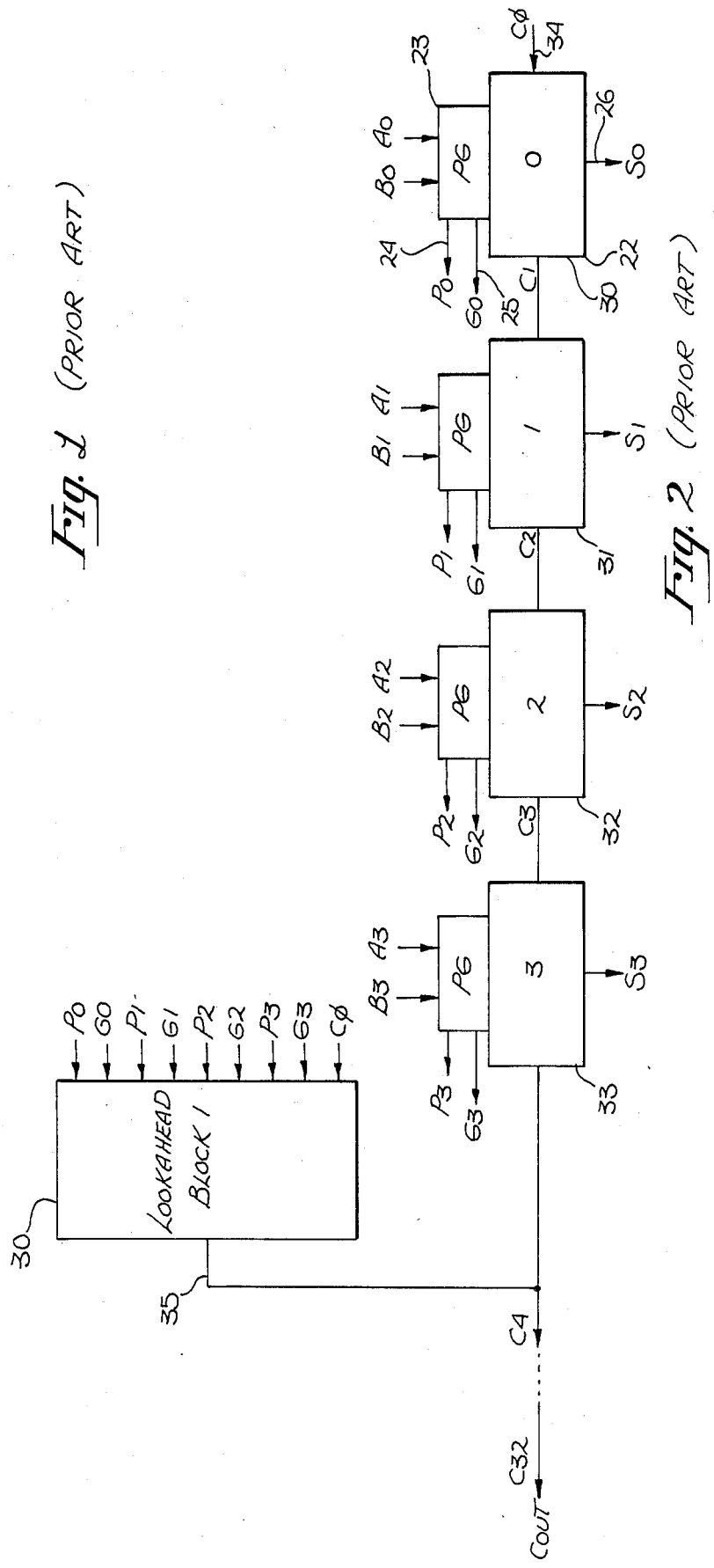
Fig. 1 (PRIOR ART)
Fig. 2 (PRIOR ART)

OPTIMALLY PARTITIONED REGENERATIVE CARRY LOOKAHEAD ADDER

BACKGROUND OF THE INVENTION

1. Field of the Invention

The invention relates to a field of digital adders and more specifically to a carry lookahead scheme in an adder.

2. Prior Art

The center of any computer or microprocessor is the arithmetic-logic unit (ALU). One primary function of any ALU is the capability of adding digital numbers. An adder circuit in the ALU provides the means of combining two numbers and generating a sum.

A typical half-adder adds two digits and provides a sum as well as a carry. A full-adder accepts an incoming carry and adds the carry-in as well, wherein a sum and a carry-out are generated. The carry-out functions as a carry-in to the next significant bit. Sequential coupling of individual full-adders provide a complete adder and the extent of the adder is determined by the number of cascaded stages. However, in a simple ripple adder, the processing time is slowed by the need to generate a carry in the preceding stage prior to performing the addition in the current stage.

To overcome this handicap, lookahead circuits were developed. A typical lookahead circuit will look at certain number of bits to be added and generate a carry-out prior to the addition of those bits to derive a sum. Hence, a typical prior art circuit combines a pair of four bits into a stage and provides a carry-out to the next stage prior to the generation of a sum in the stage. The lookahead circuitry reduces the need for rippling through every bit position and thereby reduces processing time. Unfortunately, lookahead circuits become sizeable as the number of bits in a stage is increased. Therefore, the prior art practice was to limit the number of bits to four per stage.

The present invention describes an improved scheme of combining irregular groupings of carry lookaheads to optimize the propagation of a carry. By grouping more bits in the center and less bits in the extremeties, faster carry propagation is achieved. Where higher bit processors are used, such as the 32-bit processors of today, carry propagation delay in the ALU presents a limiting factor to processing speed. The intent of the present invention is to reduce the carry propagation delay.

SUMMARY OF THE INVENTION

The present invention discloses a method of combining bits in an irregular grouping for a lookahead circuit. By grouping more bits in the center stages and less bits at the extremities, a faster carry propagation over prior art groupings is achieved. An improvement of 25% in processing time is achieved over prior art groupings in a 32-bit processor. Although the present invention is shown to apply to a 32-bit grouping, other possible combinations are also achievable. Further, the present invention may apply to ordinary adder circuits and not necessarily to ALU circuitry.

Accordingly, an object of the present invention is to provide an optimal grouping of bits in a carry lookahead adder.

Another object of the present invention is to shorten the processing time of an ALU in a processor.

BRIEF DESCRIPTION OF THE DRAWINGS

FIG. 1 illustrates a prior art ripple carry adder.

FIG. 2 illustrates a prior art carry lookahead adder.

DETAILED DESCRIPTION OF THE PRESENT INVENTION

Prior Art

Figure 3:
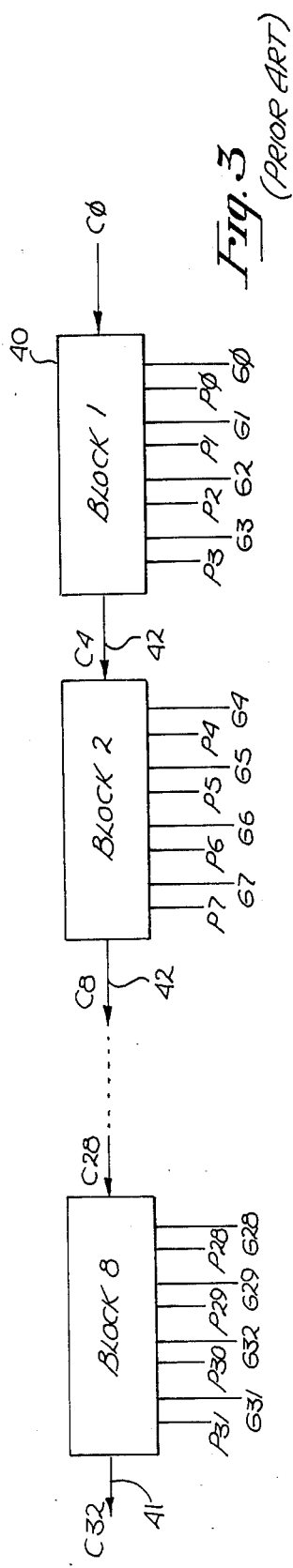
FIG. 3 illustrates a prior art practice of grouping 4 bits to each carry lookahead circuitry.

An improved scheme of grouping carry lookaheads is described. The prior art technique is discussed first to establish the foundation upon which the present invention is based. The present invention grew out of the need to increase the speed of a 32-bit processor utilizing a demultiplex 32-bit bus. Earlier carry lookahead groupings used uniform groupings, usually of 4 bits which was a result of TTL technology. The present invention, especially suitable for current semiconductor packaging, shortens processing speed significantly.

Referring to FIG. 1, a prior art ripple carry adder is shown. A complete 32-bit adder adds 2 32-bit numbers A and B as well as a carry-in 11 and generates a sum and a carry-out 12. Bit zero adder stage 10 accepts bit $A_0$ 13, $B_0$ 14, and carry-in (C) 11 and generates bit zero of the sum $S_0$ 15 and carry $C_1$ 16 to the next bit stage 17. Stage 17 performs the same sequence of operations to second bits ($A_1$ $B_1$) 18 and 19 and generates $S_1$ 20 and $C_2$ 21. The sequence is repeated 32 times at which time $C_{OUT}$ ($C_{32}$) 12 is generated. If each stage consumes t period to perform the operation, the prior art 32-bit ripple method will generate a carry-out 12 in 32t periods.

FIG. 2 illustrates a prior art 32-bit adder using a lookahead scheme. Each bit stage 22 now incorporates a PG(propagation/generate) circuit 23. Each PG circuit 23 provides a propagate signal 24 and a generate signal 25 according to the following truth table:

$$G_n = A_n B_n \quad \text{(equation 1)}$$

$$P_n = A_n \oplus B_n \quad \text{(equation 2)}$$

and a sum 26 according to equation $$S_n = A_n \oplus B_n \oplus C_n \quad \text{(equation 3)}$$

when $P_n = 1$, any carry-in is propagated to the carry-out regardless of the value of $G_n$. When $P_n = 0$, then the value of $G_n$ determines the carry-out regardless of the value of the carry-in. The propagate signal 24 and generate signal 25 are well-known in the prior art and many circuits have been designed to provide these two signals.

Lookahead circuit 30 accepts propagate and generate signals 24 and 25 from bit zero through bit three stages 30, 31, 32 and 33, as well as carry-in ($C_o$) 34. Circuit 30 internally generates its own group P and group G signals according to the following truth table:

$$Gg = G_3 + P_3G_2 + P_3P_2G_1 + P_3P_2P_1G_0 \quad \text{(equation 4)}$$

$$Pg = P_3P_2P_1P_0 \quad \text{(equation 5)}$$

Circuit 30 then generates an output 35 which is equivalent to carry-out $C_4$ of stage 33, wherein $C_4$ is determined by $$C_n = G_{n-1} + P_{n-1}G_{n-2} + P_{n-1}P_{n-2}G_{n-3} + \cdots$$
$$P +_{n-1}P_{n-2}\cdots P_0C_0 \quad \text{(equation 6)}$$

and $$C_4 = G_3 + P_3G_2 + P_3P_2G_1 + P_3P_2P_1G_0 + P_3P_2P_1P_0C_0 \quad \text{(equation 7)}$$

which is equivalent to, $$C_4 = G_g + P_gC_0 \quad \text{(equation 8)}$$

By using a lookahead circuit 30, a carry-out value for a block is calculated simultaneously as the sum values are being calculated for that block (Stages 30–33).

FIG. 3 shows a grouping for four bits per lookahead block 40. In a 32-bit adder, eight blocks are necessary to generate a carry-out 41. Each block 40 couples a carry 42 to the next significant block in a ripple fashion. Because lookahead blocks 40 perform carry determinations simultaneously with the summation operation in the bit stages, carry-out 41 is generated much more quickly than the ripple configuration of FIG. 1. Further, because each block 40 can perform in parallel, the limiting factor is determining the amount of time required for a carry propagate through the carry lookahead circuitry.

Figure 4:
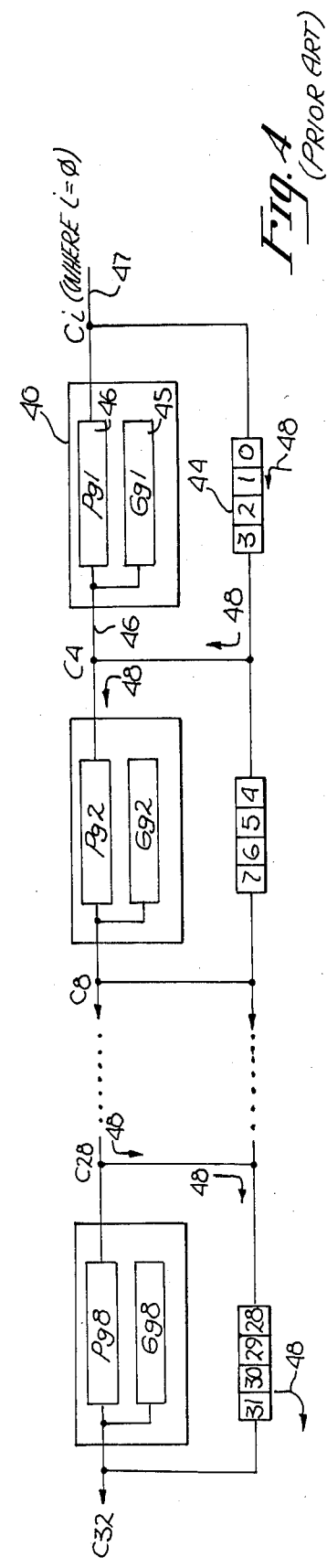
FIG. 4 is a prior art illustration of the functioning of a carry lookahead adder.

Referring to FIG. 4, a better illustration of the complete workings of a lookahead block 40 is shown. Each block 40 is a 4-bit grouping similarly illustrated in FIG. 3. The carry 42 from each block is determined by internally generated function value (Gg) 45 or propagated value (Pg) 46 wherein ($C_{out} = Gg + Pg\ C_i$). Bit adders 44 for each bit are shown coupled in groups of four for each lookahead. Therefore, the longest ripple effect occurs when a carry-in $C_o$ 47 must propagate through all eight lookahead blocks 40. Any time a carry propagation (Pg) results in zero, the carry propagation chain is terminated.

In a case where $C_o 47 = 1$ and $C_{32}$ also $= 1$, the propagation path is uninterrupted through eight complete lookahead blocks 40 (assuming carry-in $C_o$ 47 is propagated through each lookahead stage). If the delay for each lookahead is L time period, the total propagation delay is $t = 8L$.

In actuality, the worst case scenario occurs when the carry occurs at the output bit stage 0 and terminates at output bit stage 30. The worst case carry propagation path is shown by arrows 48. Because stages 0 and 31 do not propagate the carry ($P_o = P_{31} = 0$), the carry must ripple through bit adders for bits 1, 2, 3, 28, 29 and 30. Also, the carry must propagate through lookahead blocks 2 through 7 (6 blocks). Hence, if the delay for each bit adder to propagate a carry is B time period, then the total propagation delay is, $$T = 3B + 6L + 3B$$

If $B = L$, then $T = 12B$

Although lookahead circuits of more than 4 bits are possible, the logic circuit becomes complicated as shown by equation (6). Also, during the early phases of integrated circuit construction, TTL packages tended to carry four bit adders per package. Therefore, a 4-bit lookahead circuit in a single package was chosen to supplement the four bit adders. This trend has continued until now.

Present Invention

The present invention grew out of a need to develop a faster 32-bit microprocessor which is incorporated in a single semiconductor chip. Because of the dense singular packaging, the actual number of bits in a bit grouping was not a concern as to packaging, except that a large number of bits per group resulted in a complex circuitry which defeated the purpose of a lookahead.

Figure 5:
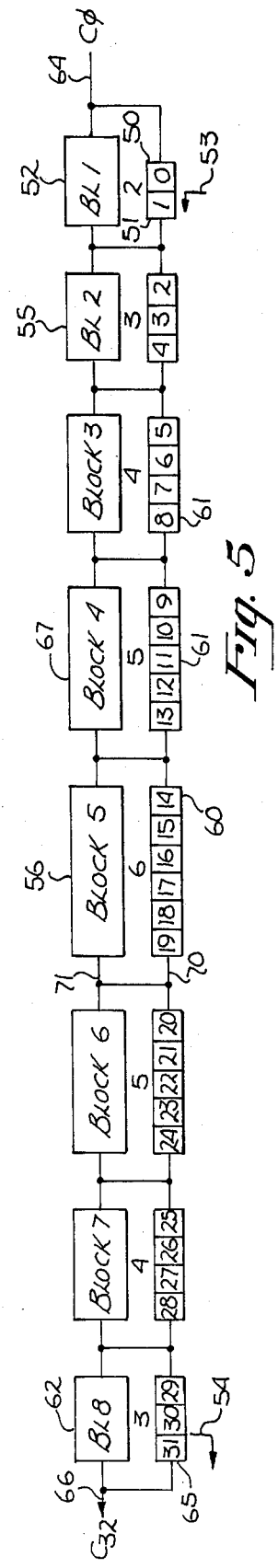
FIG. 5 is an illustration of the irregular grouping of the present invention.

FIG. 5 illustrates the present invention in operation. The 32-bit full-adder 60 is arranged in a cascaded ripple fashion with bit zero adder 50 being the least significant bit (LSB) adder and bit 31 adder 65 being the most significant bit (MSB) adder. Each bit adder 61 of 32-bit adder 60 accepts two bits, as well as a carry-in from the preceding bit adder and generates a carry-out to the next bit adder (not shown). LSB adder 50 accepts carry-in 64 and MSB adder 65 generates carry-out 66. Each bit adder 61 also includes within a PG circuit which provides P and G lines (not shown) to its respective lookahead carry generation block 67. Each lookahead block 67 is arranged in a cascaded fashion so as to accept a carry-in from the previous block and generate a carry-out to the next subsequent block. Also, first block 52 accepts carry-in 64 and last block 62 generates a carry-out 66.

The irregular grouping comprises eight blocks of carry lookaheads with large groupings in the middle and smaller groupings at the extremities. Bit zero adder 50 and bit one adder 51 comprise the first grouping and the carry lookahead is generated by first block 52. The second block 55 is comprised of three bits and the number of bits per grouping increases until the middle block 56 is reached, whereupon the number of bits per grouping decreases for subsequent blocks. The carry-out from each block of bits is provided by a ripple carry-output 70 or lookahead output 71 which is then inputted as a carry-in to the next group of bits. Naturally, the preference is for an output from the lookahead block 67.

The bit sequence in the figures is shown to have a grouping of:

3 4 5 6 5 4 3 2

The worst case propagation is shown to start at position 53 and terminate at position 54, having the path of bit stage 1, lookahead blocks 2 through 7 and bit stages 29 and 30, with a total delay of $$T = 2B + 6L + 1B.$$

(B is the bit stage delay and L is a lookahead block delay) wherein if $L = B$, then $T = 9B$. This delay is a 25% saving over the regular grouping having a worst case delay of 12B. This results in a 25% reduction in processor time over the prior art regulator grouping of bits.

In the particular embodiment, the following pattern was chosen 3 4 5 6 5 5 4, because B delay was found to be less than L delay and this pattern provided the optimal propagation delay.

Although 32-bit pattern was used in the preferred embodiment of this invention, the invention applies to other than 32 bits. Further, many irregular groupings are possible depending on the characteristics of the L and B delays. The invention is in the use of irregular lookahead groupings to yield optimal carry path delay. Further, the present invention may be used in other adder circuitry and is not limited only to the adder circuitry of the ALU.

Thus, a method of irregularly grouping adder bits for a carry lookahead circuit is described.

We claim:

1. In a digital adder having a plurality of adder cells cascaded for adding two binary numbers, each adder cell coupled to accept a corresponding bit of each number and a carry-in bit to provide a sum bit and a carry-out bit, each cell also providing a carry-propagate and carry-generate signals, a carry generation apparatus comprising:

a plurality of carry lookahead circuits arranged in a cascaded fashion, wherein each of said carry lookahead circuits is coupled to a cell group comprised of a varying number of said adder cells and accepting said carry-propagate and carry-generate signals from said adder cells of its cell group to provide a carry-out bit;

each said carry lookahead circuit is coupled in parallel to its cell group such that a carry propagating through said cell group is determined by said corresponding carry lookahead circuit;

said cell groups arranged to have a highest number of adder cells in a middle group and decreasing number of adder cells when traveling away from said middle group toward groups at the extremities;

whereby total carry propagation delay in said adder is shortened.

2. The carry generation apparatus as defined in claim 1 providing a carry forward path for 32 adder cells.

3. The carry generation apparatus as defined in claim 2, wherein said cell grouping is comprised of adder cells grouped as 3, 4, 5, 6, 5, 4, 3, 2 from most significant group to least significant group.

4. The carry generation apparatus as described in claim 2, wherein said cell grouping is comprised of adder cells arranged as 3, 4, 5, 6, 5, 5, 4 from most significant group to least significant group.

5. The carry generation apparatus as defined in claim 4 is fabricated in a semiconductor chip.

6. A method of shortening a carry propagation delay in a digital adder, comprising the steps of:

arranging serially a plurality of adder cells cascaded for adding two binary numbers, with each adder cell coupled to accept a corresponding bit of each said number and a carry-in bit to provide a sum bit and a carry-out bit, each said adder cell also providing a carry propagate and carry generate signals to a carry lookahead circuit;

grouping said cells into a varying number of cells per group for generating a carry lookahead for each said group, said grouping having a largest cell group at the center and decreasingly smaller cell groups away from the center;

arranging a plurality of said carry lookahead circuits serially to provide a carry forward path for each said grouping of cells;

coupling each said group of adder cells to said carry lookahead circuit;

whereby a faster processing time in said adder circuit is achieved compared to uniform or nearly uniform groupings of cells.

7. The method as defined in claim 6, further including the step of grouping 32 adder cells in a grouping of 3, 4, 5, 6, 5, 4, 3, 2.

8. The method as defined in claim 6, further including the step of grouping 32 adder cells in a grouping of 3, 4, 5, 6, 5, 5, 4.

* * * * *